United States Patent
Pawar et al.

(10) Patent No.: US 9,948,376 B1
(45) Date of Patent: Apr. 17, 2018

(54) TRANSMISSION MODE SELECTION

(71) Applicant: Sprint Spectrum LP, Overland Park, KS (US)

(72) Inventors: Hemanth Pawar, Brambleton, VA (US); Chunmei Liu, Great Falls, VA (US); Krishna Sitaram, Chantilly, VA (US); Pratik Kothari, Herndon, VA (US)

(73) Assignee: Sprint Spectrum LP., Overland Park, KS (US)

( * ) Notice: Subject to any disclaimer, the term of this patent is extended or adjusted under 35 U.S.C. 154(b) by 147 days.

(21) Appl. No.: 15/166,505

(22) Filed: May 27, 2016

(51) Int. Cl.
| | |
|---|---|
| H04L 12/24 | (2006.01) |
| H04B 7/06 | (2006.01) |
| H04B 7/0413 | (2017.01) |
| H04W 72/04 | (2009.01) |
| H04L 5/00 | (2006.01) |
| H04B 17/336 | (2015.01) |
| H04L 29/06 | (2006.01) |
| H04L 1/18 | (2006.01) |
| H04M 1/253 | (2006.01) |

(52) U.S. Cl.
CPC ......... *H04B 7/0617* (2013.01); *H04B 7/0413* (2013.01); *H04B 17/336* (2015.01); *H04L 1/1812* (2013.01); *H04L 5/005* (2013.01); *H04L 69/28* (2013.01); *H04M 1/2535* (2013.01); *H04W 72/042* (2013.01); *H04W 72/0486* (2013.01)

(58) Field of Classification Search
CPC .. H04B 7/0617; H04B 17/336; H04B 7/0413; H04M 1/2535; H04L 1/1812; H04L 69/28; H04L 5/005; H04W 72/0486; H04W 72/042
See application file for complete search history.

(56) References Cited

U.S. PATENT DOCUMENTS

| | | | |
|---|---|---|---|
| 9,014,135 B2 | 4/2015 | Yu et al. | |
| 9,769,810 B2* | 9/2017 | Imamura | H04W 72/042 |
| 2009/0323849 A1 | 12/2009 | Bala et al. | |
| 2013/0343303 A1 | 12/2013 | Kim et al. | |
| 2015/0036556 A1* | 2/2015 | Imamura | H04W 28/06 370/277 |
| 2015/0326340 A1* | 11/2015 | Huang | H04B 7/0413 375/267 |
| 2017/0005708 A1* | 1/2017 | Bhat | H04B 7/0452 |
| 2017/0279546 A1* | 9/2017 | McGarry | H04B 7/0452 |

* cited by examiner

*Primary Examiner* — Hashim Bhatti

(57) ABSTRACT

Transmission mode selection operations include determining that a first wireless device out of a plurality of wireless devices connected to an access node qualifies for a beamforming transmission mode, determining that a pair of wireless devices out of the plurality of wireless devices qualifies for a multi-user multiple-input multiple-output (MU-MIMO) transmission mode, comparing a first total throughput of the access node using the beamforming transmission mode with a second total throughput of the access node using the MU-MIMO transmission mode, and selecting the downlink transmission mode from the first total throughput and the second total throughput that has a highest total throughput.

20 Claims, 7 Drawing Sheets

TRANSMISSION MODE SELECTION

TECHNICAL BACKGROUND

As wireless networks evolve and grow, there are ongoing challenges in providing high-quality service to increasing numbers of wireless devices or user equipment (UE) in various coverage areas of a wireless network. For example, beamforming is a transmission mode that is used to provide better coverage to wireless devices in specific locations within a coverage area of a cell or access node. A beamforming downlink transmission mode uses multiple antennae to direct or "steer" signals from the antennae towards a particular wireless device located at, for instance, a cell edge. Multi-user multiple input multiple output (MU-MIMO) is another transmission mode whereby two wireless devices are paired based on their ability to share the same set of resource blocks, such that parallel streams are transmitted to and from both wireless devices. Both beamforming and MU-MIMO require the use of multiple antennae, with any performance gains being proportional to a number of antennae deployed by a specific cell or access node. Thus, simultaneously using both transmission modes reduces the relative gains for each transmission mode.

OVERVIEW

Exemplary embodiments described herein include systems, methods, and processing nodes for transmission mode selection based on a sector efficiency associated with each transmission mode. The sector efficiency is a throughput of the access node deploying the sector. An exemplary method for transmission mode selection includes determining that a first wireless device out of a plurality of wireless devices connected to an access node qualifies for a beamforming transmission mode, determining that a pair of wireless devices out of the plurality of wireless devices qualifies for a multi-user multiple-input multiple-output (MU-MIMO) transmission mode, comparing a first total throughput of the access node using the beamforming transmission mode with a second total throughput of the access node using the MU-MIMO transmission mode, and selecting the downlink transmission mode from the first total throughput and the second total throughput that has a highest total throughput.

An exemplary system for transmission mode selection includes a processor and a memory coupled to the processor. The memory stores computer-readable instructions that are executed by the processor to perform operations including determining a first sector efficiency of an access node using a beamforming transmission mode and a second sector efficiency of an access node using the MU-MIMO transmission mode. The method is triggered upon a first wireless device qualifying for a beamforming transmission mode from an access node, and a pair of wireless devices qualifying for a multi-user multiple-input multiple-output (MU-MIMO) transmission mode from the access node. The method includes comparing each of the first and second sector efficiencies with a third sector efficiency of the access node using a standard transmission mode, and implementing the downlink transmission mode with a highest sector efficiency from among the first, second, and third sector efficiencies.

An exemplary processing node for transmission mode selection is configured to perform operations including determining that a first wireless device connected to an access node qualifies for a beamforming transmission mode and a pair of wireless devices connected to the access node qualifies for a multi-user multiple-input multiple-output (MU-MIMO) transmission mode. The pair of wireless devices comprises a second wireless device and a third wireless device. The operations further include determining a first total throughput of the access node for the beamforming transmission mode, a second total throughput of the access node for the MU-MIMO transmission mode, and a third total throughput of the access node for a standard transmission mode. The standard transmission mode the access node uses neither the beamforming nor the MU-MIMO transmission modes. The method includes implementing the downlink transmission mode from the first, second, and third total throughputs with a highest total throughput, and repeating the method upon expiration of a timer.

DETAILED DESCRIPTION

In embodiments disclosed herein, a transmission mode is selected based on a sector efficiency of a sector deployed by an access node. For example, for a given access node comprising a plurality of antennae, one of a beamforming or MU-MIMO transmission mode is selected based on a total throughput of data that is able to be transmitted through the plurality of antennae. The selection is triggered upon determining that there are at least two wireless devices connected to the access node that qualify for a MU-MIMO transmission mode (i.e. a pair of wireless devices), and that there is at least one wireless device that qualifies for a beamforming transmission mode. In other words, since an access node can optimally deploy either beamforming or MU-MIMO but not both, the selection between the two transmission modes is triggered when there is a conflict that needs to be resolved.

In exemplary embodiments described herein, the sector efficiency may be based on a predictive calculation, such that a sector efficiency for each transmission mode is based on known parameters associated with the transmission mode as well as parameters of wireless devices that are connected to the access node. For example, transmission modes can include a beamforming transmission mode, a MU-MIMO transmission mode, and a normal transmission mode. In the normal transmission mode, neither beamforming nor MU-MIMO are used. The known parameters can include a modulation and coding scheme (MCS) of each wireless device that potentially could benefit from each transmission mode, a hybrid automatic repeat request (HARQ) capability of said each wireless device, and/or an application requirement of said each wireless device. Based on these parameters, a throughput is calculated or predicted for each transmission mode, and the transmission mode with the highest throughput, i.e. sector efficiency, is selected. In another exemplary embodiment, the sector efficiency may be based on an actual throughput calculation that is performed after implementing each transmission mode. For example, transmission modes can include a beamforming transmission mode, a MU-MIMO transmission mode, and a normal transmission mode. In the normal transmission mode, neither beamforming nor MU-MIMO are used. Based on the actual throughput calculated for each transmission mode, the transmission mode with the highest throughput, i.e. sector efficiency, is selected.

The operations disclosed herein may be performed alongside or by a scheduling module of a network node such as a controller node or access node, and may be repeated at time intervals such as a transmission time interval (TTI), or a preconfigured time period. These and additional operations are further described with respect to the embodiments depicted in FIGS. 1-7 below.

Figure 1:
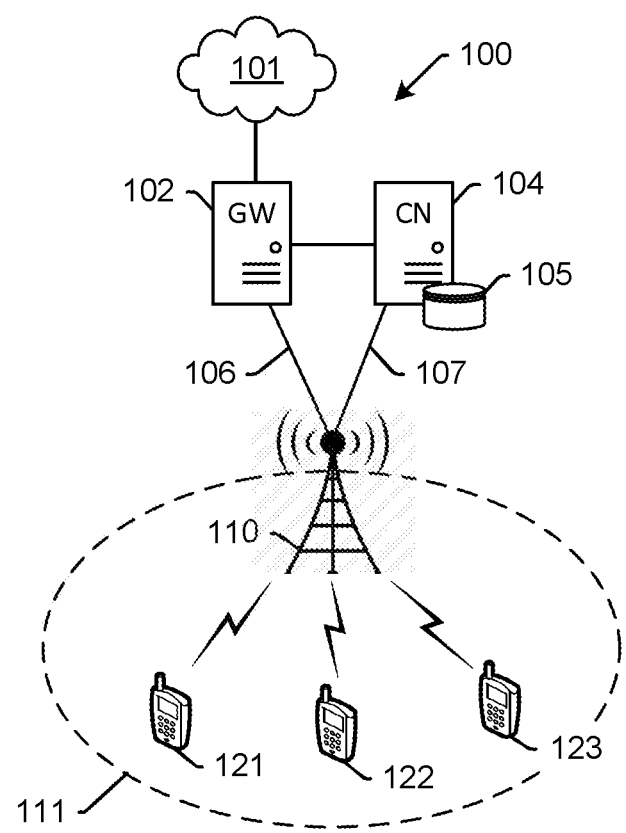
FIG. 1 depicts an exemplary system for transmission mode selection.

FIG. 1 depicts an exemplary system 100 for transmission mode selection. System 100 comprises a communication network 101, gateway 102, controller node 104, access node 110, and end-user wireless devices 121, 122, and 123. Access node 110 is illustrated as having coverage area 111, with end-user wireless devices 121, 122, 123 being located within coverage area 111 and accessing network services directly from access node 110 via an air interface deployed by access node 110. In operation, one or more of access node 110, controller node 104, or another network node, in any combination, can be configured to select a transmission mode based a sector efficiency for each transmission mode, including for a normal transmission mode using neither beamforming nor MU-MIMO. For example, access node 110 may comprise a number of antennae that can provide gains when used in only one of a beamforming or MU-MIMO transmission mode. Thus, the transmission mode may be selected based on a predicted or actual sector efficiency for each transmission mode. The selection is triggered upon determining that there are at least two wireless devices from wireless devices 121, 122, 123 that qualify for a MU-MIMO transmission mode (i.e. a pair of wireless devices), and that there is at least one wireless device from wireless devices 121, 122, 123 that qualifies for a beamforming transmission mode, as further described herein.

Access node 110 can be any network node configured to provide communication between end-user wireless devices 121, 122, 123 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes and relay nodes can be implemented within system 100.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 121, 122, 123 may be any device, system, combination of devices, or other such communication platform capable of communicating wirelessly with access node 110 using one or more frequency bands deployed therefrom. Wireless devices 121, 122, 123 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, 123, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information about wireless devices 121, 122, 123, such as MCS, HARQ, application requirements, etc. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101

Figure 2:
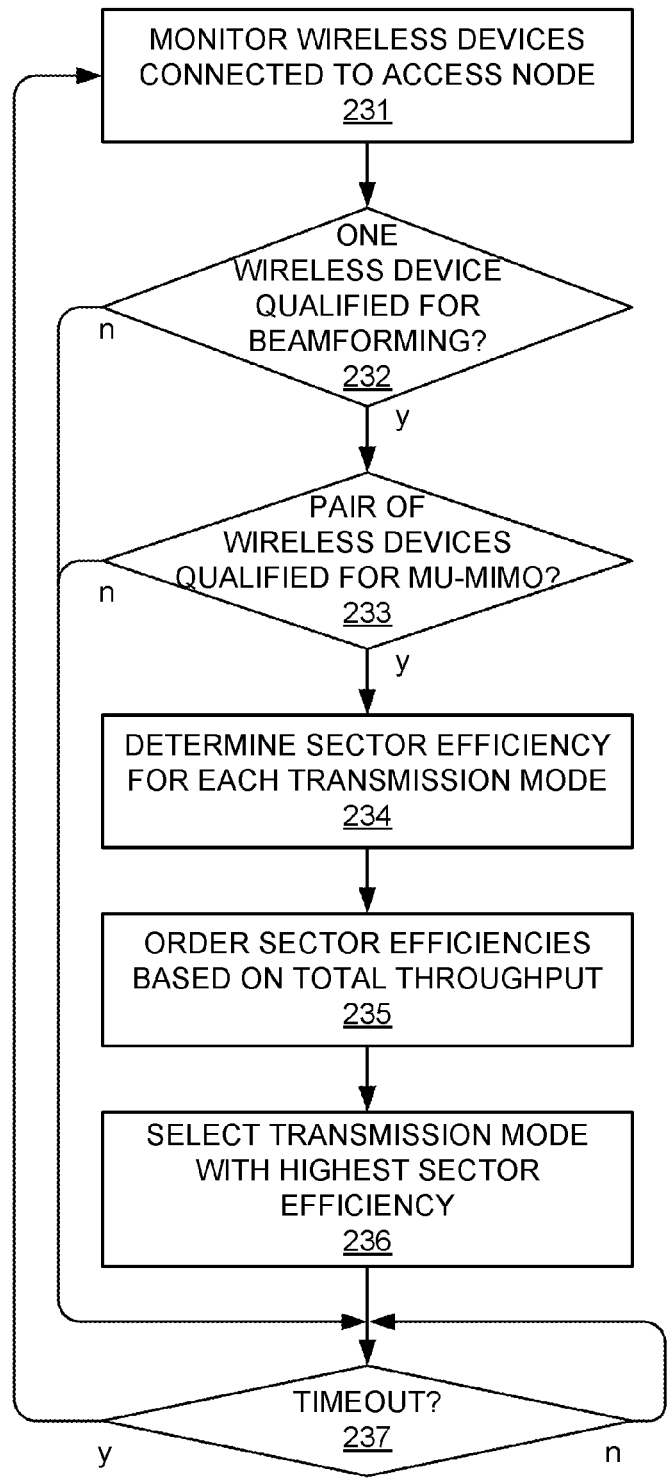
FIG. 2 depicts an exemplary method for transmission mode selection.

FIG. 2 depicts an exemplary method for transmission mode selection. The method of FIG. 2 is illustrated with respect to any network node such as a currently-serving access node, or a controller node. In other embodiments, the method can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Operations 231-233 involve monitoring wireless devices currently attached to a serving access node to determine whether or not to trigger transmission mode selection. At 231, the wireless devices are monitored to perform decisions 232 and 233. At 232, at least one wireless device may qualify for a beamforming transmission mode, and at 233, at least two wireless devices (i.e. a pair of device) may qualify for a MU-MIMO transmission mode. For example, determining that a first wireless device qualifies for the beamforming transmission mode can be based on a sounding reference signal transmitted from the first wireless device. One or more of an angle of arrival and a distance may be determined based on the sounding reference signal, and a location of the first wireless device may be determined. If the first wireless device is in a specific location or range of locations, such as at a cell edge of a coverage area of an access node, then it may qualify for beamforming. Further, determining that the pair of wireless devices qualifies for the MU-MIMO transmission mode can be based on a channel orthogonality and/or a SINR of each of the second and third wireless devices. At least a threshold channel orthogonality and SINR is recommended for optimal MU-MIMO transmission, and pairs of devices meeting the thresholds are qualified for MU-MIMO transmission. See FIGS. 4 and 5 for detailed methods regarding qualifying devices for different transmission modes.

If both decisions 232 and 233 result in an affirmative outcome, subsequent steps 234-236 for selecting between the two transmission modes are performed. If any one of decisions 232 and 233 result in a negative outcome, then there is no conflict needing to be resolved, and the method awaits expiration of a timer at 237 before repeating. Although not shown here, it will be appreciated by those having ordinary skill in the art that, upon no conflict being determined, an appropriate transmission mode can be selected without going through steps 234-236. Moreover, it will be appreciated that decisions 232 and 233 may be performed in any order in addition to the order depicted in FIG. 2, with no material change in the inventive concepts described herein.

At 234, a sector efficiency is determined for each transmission mode. As further described in FIGS. 3A-3B, the sector efficiency may be based on one or both of a predictive calculation based on known parameters associated with the transmission mode and wireless devices connected to the access node, or based on an actual throughput calculation that is performed after implementing each transmission mode for a period of time. In either case, the sector efficiencies are ordered based on total throughput at 235, and the transmission mode with the highest throughput, i.e. sector efficiency, is selected at 236. For example, if the beamforming transmission mode results in the highest sector efficiency for the access node and/or sector deployed therefrom, then the beamforming transmission mode is selected at 236, and the method moves to the timer 239. If the throughputs of the beamforming and the MU-MIMO transmission modes are equal, then the MU-MIMO transmission mode is selected at 236. In other words, the MU-MIMO transmission mode may be considered the default transmission mode, at least because fulfilling the requirements of two devices (i.e. the MU-MIMO pair) would yield greater efficiencies in the network. If neither beamforming nor MU-MIMO results in a throughput (predicted or actual) that exceeds the normal transmission mode, then neither transmission mode is implemented for the duration of timer 237. At 237, a transmission time interval (TTI) or any other preconfigured time period is monitored to determine when to repeat the operations starting back at monitoring operation 231.

In some embodiments, a predictive calculation may be performed for one transmission mode, and an actual calculation for another transmission mode. For example, after implementing beamforming, a pair of devices qualifying for MU-MIMO is found, in which case the throughput for the beamforming transmission mode is already available, and the throughput for MU-MIMO is predicted prior to determining whether to change transmission modes. In another example, after implementing MU-MIMO for a pair of devices, a device qualifying for beamforming is found, in which case the throughput for the MU-MIMO transmission mode is already available, and the throughput for beamforming is predicted prior to determining whether to change transmission modes.

Figure 3A:
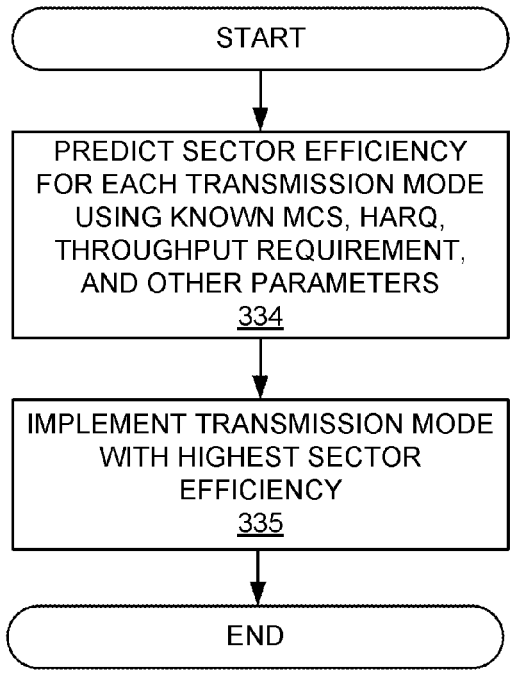
FIG. 3A-3B depict exemplary methods for determining a sector efficiency.
Figure 3B:
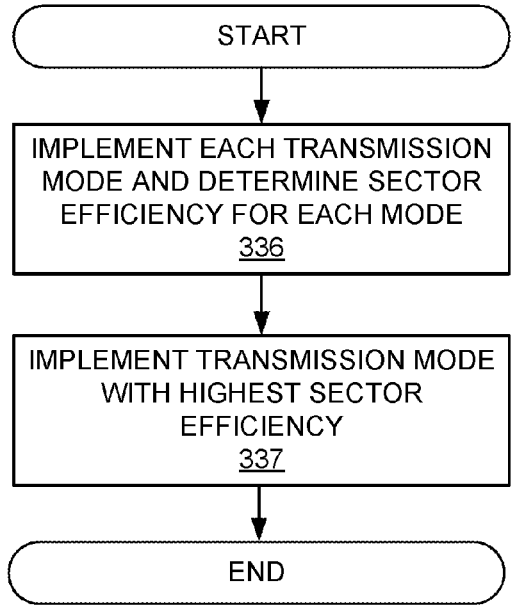

FIG. 3A-3B depict exemplary methods for determining a sector efficiency. The methods of FIGS. 3A-3B are illustrated with respect to any network node such as a currently-serving access node, or a controller node. In other embodiments, the methods can be implemented with any suitable network element. Although FIGS. 3A-3B depict steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Referring to FIG. 3A, a sector efficiency for each transmission mode is predicted using a plurality of parameters at 334. The parameters may be anything that affects the efficiency for a sector deployed by an access node. Generally, a sector efficiency refers to the information rate that can be transmitted over a given bandwidth in a specific communication system, and may be measured in (bit/s)/Hz per unit area, in (bit/s)/Hz per cell, or in (bit/s)/Hz per sector. In other words, the sector efficiency indicates the quantity of users or services that can be simultaneously supported by a specific radio frequency (deployed by the access node) in a defined geographic area (i.e. coverage area). In exemplary embodiments, the sector efficiency may be defined as the maximum aggregated throughput (i.e. summed over all users in the system) divided by the channel bandwidth. As this throughput measure is affected by all the transmission modes used for wireless devices, including beamforming and MU-MIMO, the parameters used to predict sector efficiency can therefore be any variable that affects the throughput, such as the MCS used in the transmissions, HARQ requests, and/or a content or application type of the transmissions. At 335, the transmission mode with the highest predicted sector efficiency is implemented.

Referring to FIG. 3B, at 336, each transmission mode is individually implemented by the network, and the sector efficiency thereof calculated. The sector efficiency in this case need not be predicted, since it can simply be calculated by monitoring changes in the throughput of the sector deployed by the access node, and may be measured in (bit/s)/Hz per unit area, in (bit/s)/Hz per cell, or in (bit/s)/Hz per sector. Each transmission mode may be individually implemented for a period of time, and sector efficiencies for each transmission mode determined. Then, at 337, the transmission mode having the highest sector efficiency is implemented, subject to the timer determinations described in FIG. 2.

Figure 4A:
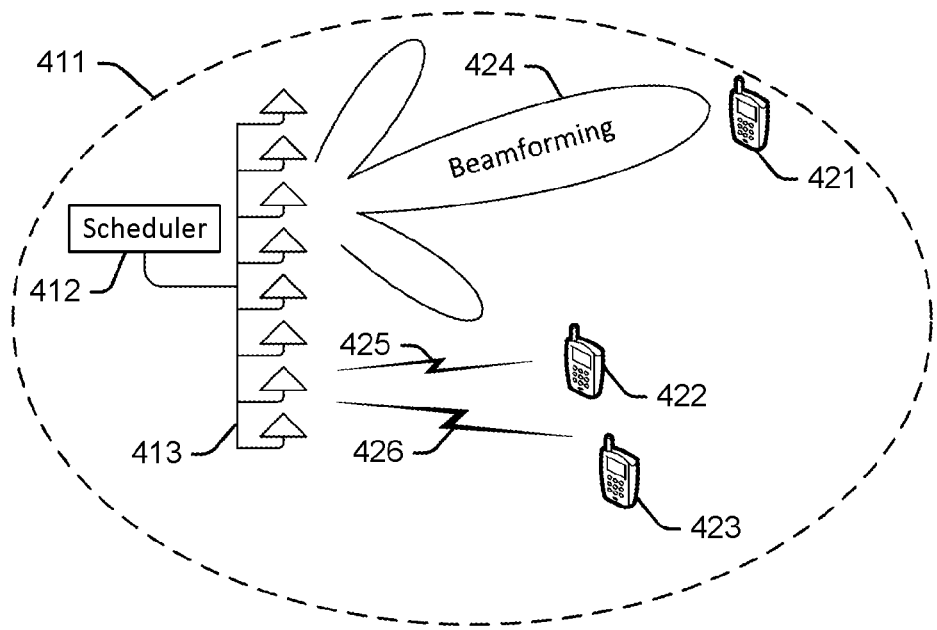
FIG. 4A-4B respectively depict exemplary selections of beamforming and MU-MIMO transmission modes.
Figure 4B:
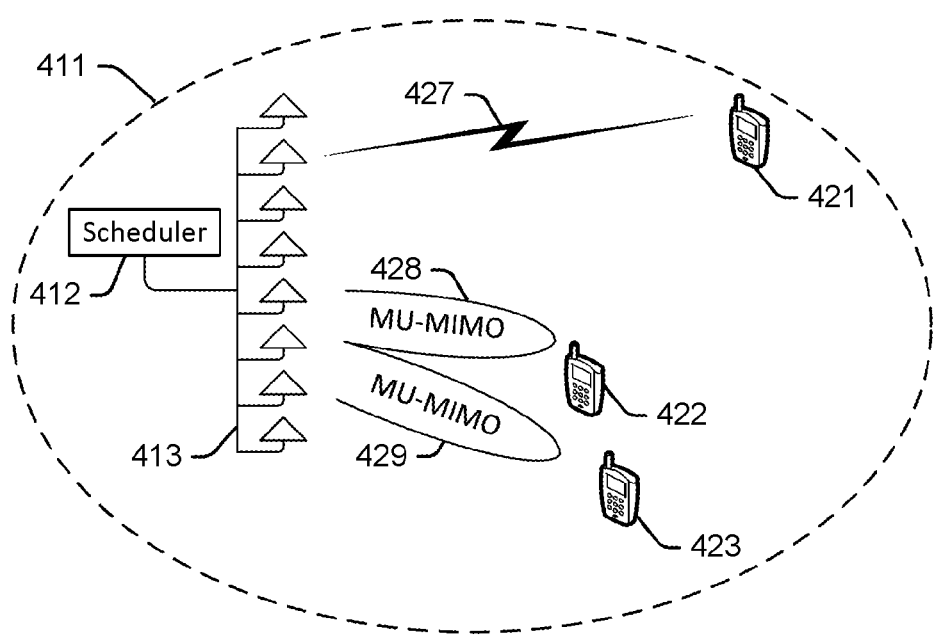

FIG. 4A-4B respectively depict exemplary selections of beamforming and MU-MIMO transmission modes. Both FIGS. 4A and 4B depict a scheduler 412 coupled to an antenna array 413 that has an effective coverage area of 411. Scheduler 412 and antenna array 413 may be part of an access node (not shown) similar to access node 110 in FIG. 1. Moreover, other components for enabling antenna array 413 to send and receive signals to and from wireless devices 421, 422, 423 within coverage area 411 are not shown for clarity. In either case, with reference to FIG. 4A, a selection of a beamforming transmission mode results in a first wireless device 421 receiving a beamformed signal 424, and second and third wireless devices 422, 423 receiving normal transmissions 425 and 426 from antenna array 413, respectively. In other words, since antenna array 413 can only effectively perform one transmission mode from among beamforming and MU-MIMO, the beamforming transmission mode 424 is selected. Beamforming transmission mode 424 may be selected based on a total throughput/sector efficiency of the beamforming transmission mode being higher than any other transmission mode.

Referring to FIG. 4B, a selection of a MU-MIMO transmission mode results in first wireless device 421 receiving a normal signal 427, and second and third wireless devices 422, 423 receiving MU-MIMO transmissions 428 and 429 from antenna array 413, respectively. Since antenna array 413 can only effectively perform one transmission mode from among beamforming and MU-MIMO, the MU-MIMO signals 428, 429 are transmitted to wireless devices 422, 423, likely based on the sector efficiency of the MU-MIMO transmission mode being higher than any other transmission mode.

Figure 5:
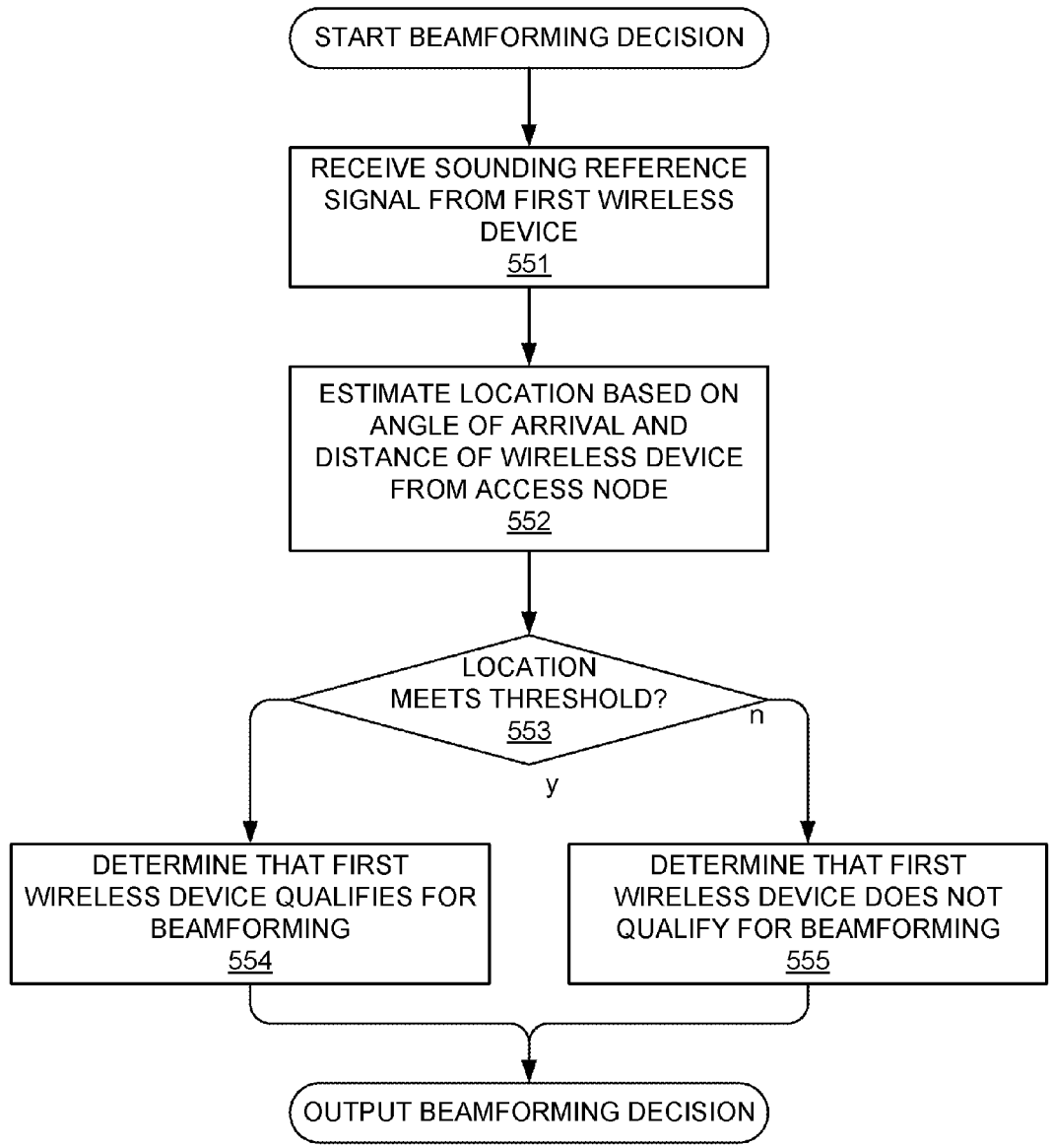
FIG. 5 depicts an exemplary method for determining whether a wireless device qualifies for beamforming.

FIG. 5 depicts an exemplary method for determining whether a wireless device qualifies for beamforming. As described herein, beamforming uses multiple antennas within an array to contribute to a steered signal having an array gain, thereby providing better coverage to specific areas along the edges of cells. To determine whether or not a wireless device qualifies for beamforming, a signal from the wireless device is monitored. For example, at 551, a sounding reference signal (SRS) is received at an access node. The access node (or a scheduler coupled thereto) may have allocated a resource block for the SRS to determine whether or not the wireless device qualifies for beamforming. The SRS is receive at multiple antennae of the access node, upon which the access node processes the received SRS at 552 to estimate location of the wireless device transmitting the SRS. The location may be estimated based on a direction or angle of arrival as well as a distance of the wireless device from the access node. The angle of arrival may be determined using, for instance, multiple signal classification (MUSIC) and estimation of signal parameter via rotational invariance technique (ESPRIT) operations. The distance between the access node and the wireless device may be estimated using, for instance, the timing of the received SRS.

Based on the angle and the distance, the location of the wireless device may be estimated with an estimation error range. Subsequently, at 553, the location and error range thereof are compared with thresholds to determine whether or not the wireless device qualifies for beamforming. The thresholds may include, for instance, approximate areas of the coverage area of the access node that may benefit from beamforming. If the location meets the thresholds, the wireless device is determined to qualify for beamforming at 554. If the location does not meet the thresholds, the wireless device does not qualify for beamforming at 555. In either case, a decision is output, and other operations may be performed as described in, for instance, FIG. 2.

Figure 6:
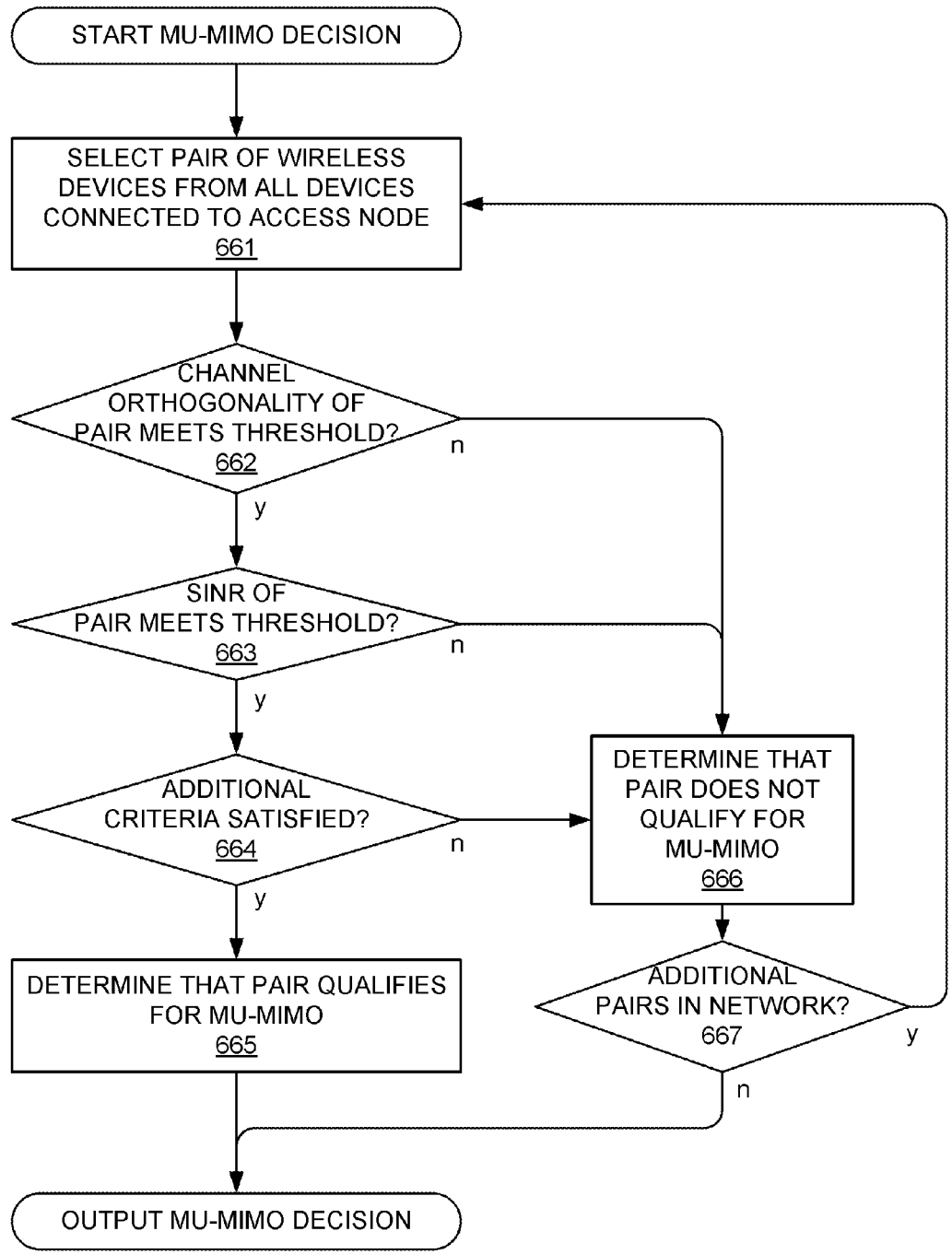
FIG. 6 depicts an exemplary method for determining whether a pair of wireless devices qualifies for MU-MIMO.

FIG. 6 depicts an exemplary method for determining whether a pair of wireless devices qualifies for MU-MIMO. As described herein, in a MU-MIMO transmission mode, data streams can be transmitted to and from different wireless devices using the same resource block or set of resource blocks, thereby increasing overall spectral efficiency in a cell deployed by an access node. Pairing of wireless devices is used to realize the benefit of MU-MIMO, as it determines which wireless devices can share the same resource blocks different transmissions. In exemplary embodiments, the pairing decision may be performed at every subframe, i.e. at every 1 ms.

At 661, the method begins with selection of a pair of wireless devices from among the devices connected to an access node. The pair of wireless devices is subject to a first criteria for channel orthogonality compared with a threshold. Only a pair of wireless devices with channel orthogonality above a predefined threshold can be considered for pairing. Thus, if the threshold is not met, at 666 it is determined that the pair does not qualify for MU-MIMO, and additional pairs are determined at 667, if available. If the threshold is met, then a second criteria of the SINR meeting a threshold is evaluated at 663. Only wireless devices with the SINR above a predefined threshold may be considered for pairing. If the threshold is met, then at 664, one or more additional criteria may be evaluated. The one or more additional criteria may include: whether or not there are sufficient resource blocks in the current transmission time interval (TTI) to schedule MU-MIMO, whether or not a threshold throughput gain is achieved after pairing the wireless devices in MU-MIMO mode, whether or not the wireless device uses HARQ retransmission, whether or not one or both wireless devices require a guaranteed bit rate (GBR), such that devices that do not require GBR are prioritized higher, whether or not the wireless devices utilize TTI bundling (these will not be selected as pairs as they typically reside around cell edges), and whether or not they have higher transmission speed capabilities (which are excluded from pairing).

In either case, if all criteria are satisfied, it is determined that the pair of wireless devices qualifies for MU-MIMO at 665, and the decision is output. The method need not check for additional pairs in the network, as only one requirement is sufficient to trigger the method of FIG. 2, as described herein. However, in some exemplary embodiments, a number of pairs may be determined, and threshold numbers of pairs may be exceeded prior to executing the method of FIG. 2, or other operations described herein.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, scheduler 312, controller node 107, and/or network 101.

Figure 7:
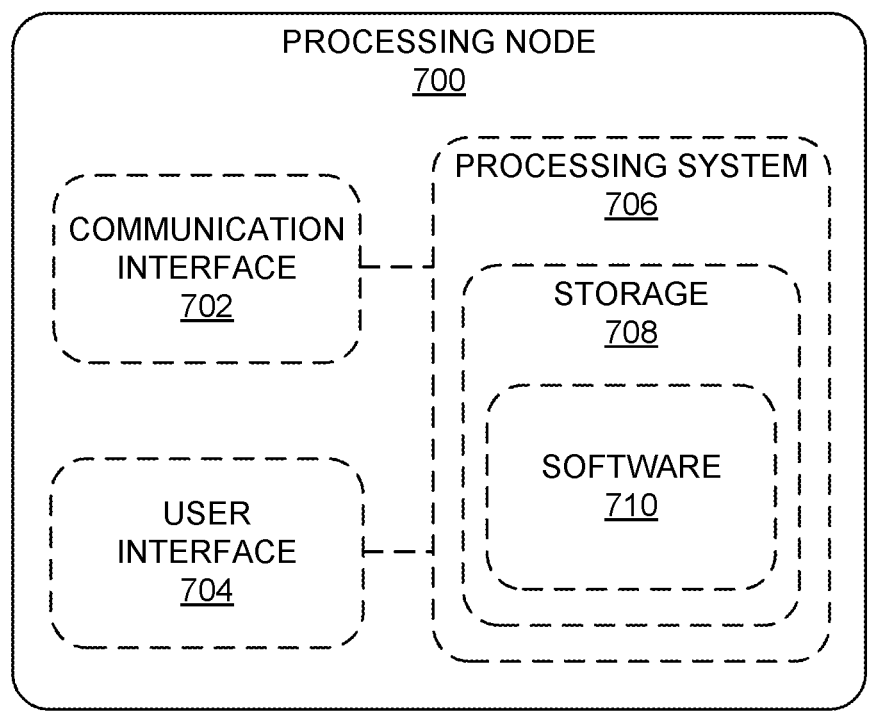
FIG. 7 depicts an exemplary processing node for transmission mode selection.

FIG. 7 depicts an exemplary processing node 700 comprising a communication interface 702, user interface 704, and processing system 706 in communication with communication interface 702 and user interface 704. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. For example, storage 708 may include a buffer. Software 710 may include computer programs, firmware, or some other form of machine-readable instructions, including an operating system, utilities, drivers, network interfaces, applications, or some other type of software. For example, software 710 may include a scheduler module. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a downlink transmission mode, the method comprising:
    determining that a first wireless device out of a plurality of wireless devices connected to an access node qualifies for a beamforming transmission mode;
    determining that a pair of wireless devices out of the plurality of wireless devices qualifies for a multi-user multiple-input multiple-output (MU-MIMO) transmission mode;
    comparing a first total throughput of the access node using the beamforming transmission mode with a second total throughput of the access node using the MU-MIMO transmission mode; and
    selecting the downlink transmission mode from the first total throughput and the second total throughput that has a highest total throughput.

2. The method of claim 1, further comprising comparing the first total throughput and second total throughput with a third total throughput of the access node using neither the beamforming nor the MU-MIMO transmission mode; and selecting neither transmission mode upon the third total throughput being higher than the first and second total throughputs.

3. The method of claim 1, further comprising predicting the first and second total throughputs prior to the comparing.

4. The method of claim 1, further comprising individually implementing each transmission mode and determining the first and second throughputs prior to the comparing.

5. The method of claim 1, further comprising determining that the first wireless device qualifies for the beamforming transmission mode based on a sounding reference signal transmitted from the first wireless device.

6. The method of claim 5, further comprising determining one or more of an angle of arrival and a distance based on the sounding reference signal.

7. The method of claim 1, further comprising determining that the pair of wireless devices qualifies for the MU-MIMO transmission mode based on a channel orthogonality of the pair of wireless devices meeting a first threshold.

8. The method of claim 7, further comprising determining that the pair of wireless devices qualifies for the MU-MIMO transmission mode based on a signal-to-interference-plus-noise (SINR) of each of the pair of wireless devices meeting a second threshold.

9. The method of claim 1, further comprising repeating the method upon expiration of a timer.

10. A system for selecting a downlink transmission mode, the system comprising:
    a processor; and
    a memory coupled to the processor, the memory to store computer-readable instructions that are executed by the processor to perform operations comprising:
        upon a first wireless device qualifying for a beamforming transmission mode from an access node, and a pair of wireless devices qualifying for a multi-user multiple-input multiple-output (MU-MIMO) transmission mode from the access node, determining a first sector efficiency of the access node using the beamforming transmission mode and a second sector efficiency of the access node using the MU-MIMO transmission mode;
        comparing each of the first and second sector efficiencies with a third sector efficiency of the access node using a standard transmission mode; and
        implementing the downlink transmission mode with a highest sector efficiency from among the first, second, and third sector efficiencies.

11. The system of claim 10, wherein the first, second, and third sector efficiencies are predicted based on a known signal criteria for each wireless device.

12. The system of claim 11, wherein the known signal criteria comprise one or more of a modulation and coding scheme (MCS) or a hybrid automatic repeat request (HARQ) for each wireless device.

13. The system of claim 10, wherein each of the first, second, and third sector efficiencies is based on a corresponding first, second, and third throughput of the access node.

14. The system of claim 13, wherein the operations further comprise implementing the beamforming transmission mode, and determining the first sector efficiency based on a first throughput of the access node using the beamforming transmission mode.

15. The system of claim 14, wherein the operations further comprise implementing the MU-MIMO transmission mode, and determining the second sector efficiency based on a second throughput of the access node using the MU-MIMO transmission mode.

16. A processing node for selecting a downlink transmission mode, the processing node comprising: a memory coupled with a processor, wherein the processor is configured to:
    determining that a first wireless device connected to an access node qualifies for a beamforming transmission mode and a pair of wireless devices connected to the access node qualifies for a multi-user multiple-input multiple-output (MU-MIMO) transmission mode, wherein the pair of wireless devices comprises a second wireless device and a third wireless device;
    determining a first total throughput of the access node for the beamforming transmission mode, a second total throughput of the access node for the MU-M IMO transmission mode, and a third total throughput of the access node for a standard transmission mode, wherein in the standard transmission mode the access node uses neither the beamforming nor the MU-M IMO transmission modes; implementing the downlink transmission mode from the first, second, and third total throughputs with a highest total throughput; and upon expiration of a timer, repeating the method.

17. The processing node of claim 16, wherein the timer comprises a transmission time interval (TTI).

18. The processing node of claim 16, wherein the timer has a duration of 1 ms.

19. The processing node of claim 16, wherein the timer has an interval of 1 s.

20. The processing node of claim 16, wherein each transmission mode is a downlink transmission mode.

* * * * *